United States Patent [19]
Zoor

[11] Patent Number: 5,249,879
[45] Date of Patent: Oct. 5, 1993

[54] QUICK RELEASE FOR A BICYCLE

[75] Inventor: Reinhold Zoor, Eichenau, Fed. Rep. of Germany

[73] Assignee: K.W. Hochschorner GmbH, Martinsried, Fed. Rep. of Germany

[21] Appl. No.: 866,641

[22] Filed: Apr. 13, 1992

[30] Foreign Application Priority Data

Apr. 11, 1991 [DE] Fed. Rep. of Germany ... 9104431[U]

[51] Int. Cl.$^5$ .................................................. B62K 3/00
[52] U.S. Cl. ...................................... 403/374; 301/111
[58] Field of Search ............... 301/105 B, 111, 112, 301/113, 119, 120; 24/270; 70/233; 403/374

[56] References Cited

U.S. PATENT DOCUMENTS

| 701,669 | 6/1902 | Atkinson | 24/270 X |
| 3,128,512 | 4/1964 | Moulton | 24/270 |
| 4,440,414 | 4/1984 | Wang | 301/112 X |
| 5,022,672 | 6/1991 | Kawai | 70/233 X |

Primary Examiner—Randolph A. Reese
Assistant Examiner—Anthony Knight
Attorney, Agent, or Firm—Keck, Mahin & Cate

[57] ABSTRACT

A quick release for a bicycle has at least one eccentric cam provided with a bearing bore by which the cam is rotatably mounted on a shaft, which is fitted to a component, which can be secured with the aid of the eccentric cam to a bicycle. The eccentric cam can be rotated by a hand lever into a clamping position and can be released from the latter by rotation in the opposite direction. The hand lever is constructed as a lever arm which is substantially U-shaped. The two free ends of the legs of the U-shaped lever arm are, in each case, arranged in a lever arm fixing bore in the eccentric cam and have a channel, which engages around the shaft, through which the level arm is fixed in the eccentric cam.

10 Claims, 3 Drawing Sheets

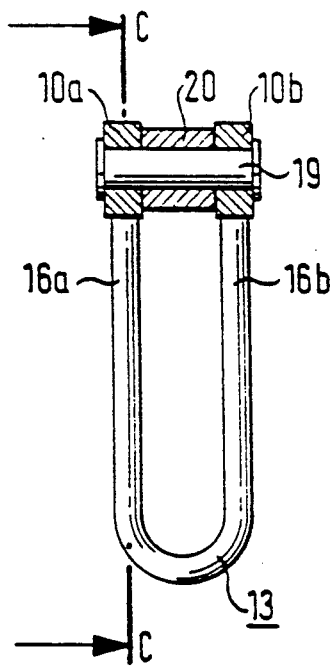
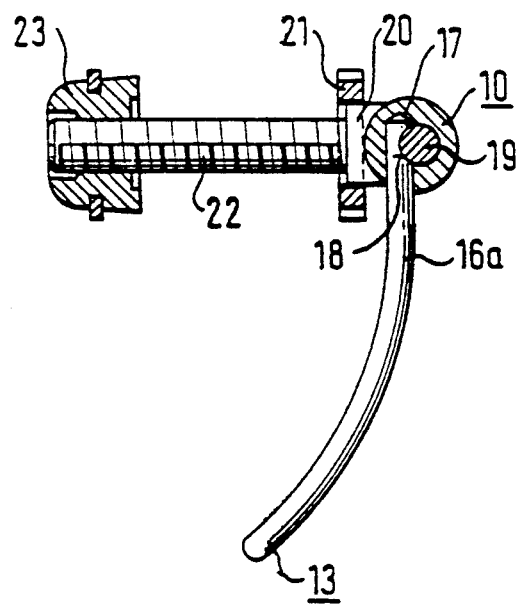

QUICK RELEASE FOR A BICYCLE

BACKGROUND OF THE INVENTION

This invention relates to a quick release for a bicycle, with at least one eccentric cam having a bearing bore in which it is rotatably mounted on a shaft. The shaft is fitted to a component which, with the aid of the eccentric cam, can be rotated with a hand lever into the clamped position. By a rotary movement in the opposite direction, the component can be released from the clamped position.

Such a quick release for a bicycle is known from the catalogue "Taiwan Bicycles & Parts Guide (TBG)", 1990/1, published by Trade Winds Inc., P.O. Box 7-179, Taipei, Taiwan. Such quick releases are used for locking different components to a bicycle. For example, a wheel hub can be locked in a fork. Such a quick release can also be used for fixing handle bars to a fixing rod. In addition, for example, a saddle or seat mounted on a rod can be fixed to a support tube. It is also conceivable that other components can be secured to a bicycle with the aid of a quick release of the aforementioned type.

The quick release according to the invention can fundamentally also be used for fixing a component to an object other than a bicycle. In fact, it can be used wherever it is necessary to fix a component with the aid of an eccentric cam to an object, if the cam is operated with the aid of a hand lever.

Although the known quick releases are suitable to bring about an adequate reliable fixing, they are relatively heavy and expensive to manufacture, because relatively high tool costs are involved for producing a suitable tool. It is also scarcely possible, in the case of the known quick releases, to adequately flexibly adapt the hand levers at reasonably cost to the requirements of the intended. This is because, as a result of desired modifications to the shape of such a handle lever, tool costs would arise which would not be acceptable particularly in the case of smaller batches.

SUMMARY OF THE INVENTION

The object of the invention is to provide a quick release of the aforementioned type which, for particularly economic manufacture and fitting, has a very low weight and at the same time has a shape which can be very easily adapted to specific bicycle shapes or other shape requirements.

According to the invention, this object is achieved in that the hand lever is constructed as a lever arm, which is substantially U-shaped, and the two free ends of the U-legs are, in each case, located in a lever arm fixing bore in the eccentric cam. These free ends have a channel, which engages around the shaft, fixing the lever arm in the eccentric cam. The lever arm is made from a flexurally rigid material.

The lever arm can be easily and economically manufactured and its shape can be adapted to the most varied circumstances and wishes. In particular, the tool costs for the manufacture of an inventive lever arm are extremely low. Fitting is also particularly simple in that the lever arm only has to be inserted in a lever arm fixing bore in the eccentric cam and is subsequently held in this position. The shaft is inserted in the eccentric cam and, by means of the channel in the lever arm, ensures a reliable and precise fixing of the lever arm in the eccentric cam.

According to a preferred embodiment of the invention, there are two eccentric cams arranged on either side of the component which is to be locked to a bicycle. This ensures that the lever arm is fixed in a reliable and stable manner relative to the shaft and also that the two eccentric cams bring about a reliable wedging and, consequently, an operationally reliable fixing of the component to the bicycle.

To adapt the shape of the lever arm to specific shape requirements, preferably, the surface defined by the two U-legs thereof is bent in a substantially L-shaped manner.

In an alternative preferred embodiment, the arrangement can be such that the surface defined by the two U-legs of the lever arm is shaped like a cylindrical surface segment. This allows numerous modifications to the lever arm shape, which allow an optimum adaptation of the lever arm shape to the conditions existing on a particular bicycle. It is obvious that the shaping for the inventive lever arm is possible with very small technical expenditure, so as in this way to offer an optimum design flexibility.

Also, the U-shape of the lever arm can be expanded in C-shaped manner in the vicinity of the U-cross-arm. Such a shape may be appropriate, in many cases, so that the lever arm can be reliably gripped.

According to a further embodiment of the invention, the U-shape of the lever arm is expanded in pear-shaped manner in the vicinity of the U-cross-leg. Such an embodiment is advantageous for certain shape requirements and also allows the application of a considerable force when handling the lever arm.

In order to give the inventive lever arm a considerable flexural rigidity, the lever arm can be made from metal. It is particularly appropriate for the lever arm to be made from spring steel wire.

A good compromise between flexural rigidity, on the one hand, and low weight, on the other, is provided by an embodiment of the lever arm which is characterized in that the diameter of the U-legs of the lever arm is 3 to 4 mm.

A particularly aesthetically pleasing design of the invention provides for the lever arm being given a plastic covering. This also makes handling more pleasant and, by different colourings of the plastic coverings, an optimum, optical appearance is given.

Thus, according to the invention, it is possible to achieve the important technical advance that as a result of economic manufacture of the object of the invention, even in the case of relatively small batches, due to the minimum tool costs, an optimum adaptability as regards shape can be obtained and, at the same time, a very low weight is ensured.

BRIEF DESCRIPTION OF THE DRAWINGS

The invention is described in greater detail hereinafter relative to nonlimitative embodiments and the attached drawings.

FIG. 5 is a plan view of a third embodiment of the invention.

FIG. 6 is a section view along line C—C of FIG. 5.

DESCRIPTION OF THE PREFERRED EMBODIMENTS

Figure 1:
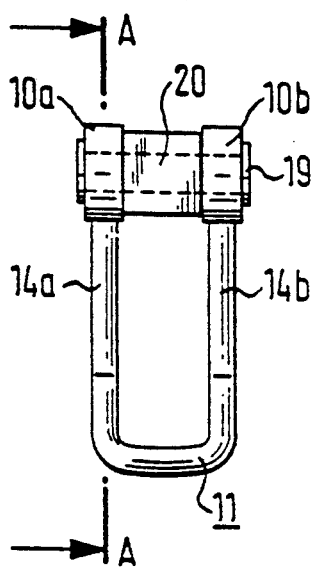
FIG. 1 is a plan view of a quick release according to the invention.
Figure 2A:
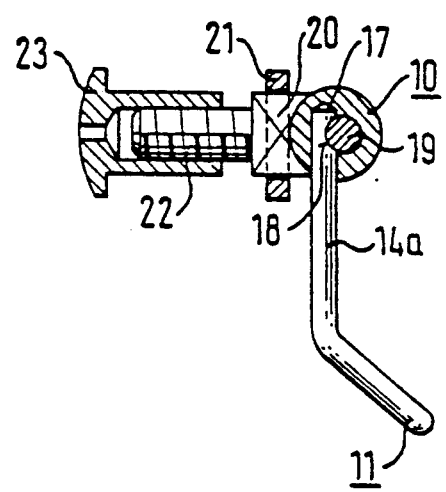
FIG. 2a is a section view along line A—A in FIG. 1.
Figure 2B:
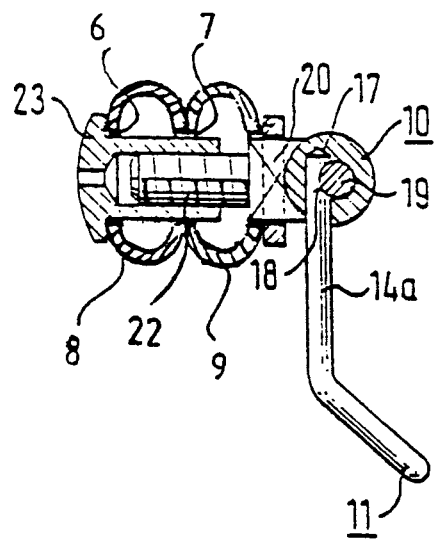
FIG. 2b is an example, corresponding to FIG. 2a of the invention in use.

FIGS. 1, 2a and 2b show a first embodiment of the quick release according to the invention, which is characterized in that a lever arm 11, fitted to two eccentric cams 10a and 10b is bent in substantially L-shaped manner. More precisely the two U-legs 14a, 14b of the lever arm 11 are bent in a substantially L-shaped manner, as is clearly shown in FIG. 2a. The two L-legs form an obtuse angle with one another in this arrangement. As is also shown in FIG. 2a the two L-legs of the lever arm 11 are of substantially the same length.

FIG. 2a also shows that the two free ends of the U-legs 14a, 14b are, in each case, placed in a lever arm fixing bore 17 in the two eccentric cams 10a, 10b, which are generally designated by reference number 10 in FIG. 2a. A channel 18 is formed in the two U-legs 14a, 14b in the area in which the U-legs 14a, 14b are located in the fixing bore 17. This channel 18 is constructed in such a way, and fitted to the two U-legs 14a, 14b, that its wall is aligned with the wall of the lever arm fixing bore 17. Thus, a shaft 19 can be inserted in the fixing bore 17 in such a way that the shaft 19 engages in the channel 18, so that in this way, the lever arm is fixed in interlocking manner with the aid of the channel 18 in the lever arm fixing bore 17 and, therefore, in the eccentric cam 10.

FIG. 1 shows that the shaft 19 is fixed by riveting the two ends thereof projecting on either side from the eccentric cams 10a, 10b. Naturally any other way of fixing the shaft can be used in practice.

It can also be gathered from FIGS. 1, 2a and 2b that the shaft 19 not only passes through the two eccentric cams 10a, 10b, but also between a component 20 positioned between them. According to FIG. 2a, a threaded pin 22 is fitted to the component 20, and a cap nut 23 is screwed onto the pin. The component 20 is also surrounded by a disk 21, against which engages the eccentric cam 10.

According to FIG. 2a the disk 21 is moved to the left when the eccentric cam 10 is rotated clockwise. If it is imagined that to the left of the disk 21 there is a part of a bicycle or some other object, it is clear that when the lever arm 11 is moved clockwise, which causes a concomitant movement of the eccentric cam 10, as a result of the leftward movement of the disk 21, the disk may be pressed against the part of the bicycle or other object so as to wedge it against the same.

It is clear that the aforementioned wedging action can be released by rotating the lever arm 11 and, consequently, the eccentric cam 10 counterclockwise.

The quick release shown in FIGS. 1, 2a and 2b offers numerous possibilities for use in a bicycle, some other vehicle, or another apparatus and, in general, whenever a wedging or jamming action is to be brought about with the aid of a hand-operated lever.

The handling of the quick release is as follows: Firstly the nut 23 is unscrewed from the threaded pin 22. Then the lever arm 11 is moved counterclockwise to bring the eccentric cam 10 into its unlocked position, enabling the disk 21 to be moved to the right. The two parts to be fixed are connected by the threaded pin 22 and the nut 23. Finally, the lever arm 11 is moved clockwise, so that the eccentric cam 10 is brought into its locked position, where the disk 21 is moved to the left. By moving the lever arm 11 and decreasing the distance between the disk 21 and the nut 23, the two parts are easily and rapidly fixed.

The quick release can be used to connect and fix various parts to a bicycle whenever these two parts can be put together on a threaded pin 22.

As an example, FIG. 2b shows in a sectional view, two tubes 8, 9, each having a hole 6, 7, through which is engaged the threaded pin 22. These tubes can, e.g., be part of the handle bars of a bicycle.

Figure 3:
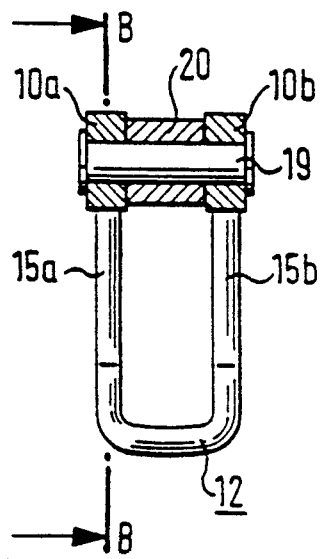
FIG. 3 is a plan view of a second embodiment of the invention.
Figure 4:
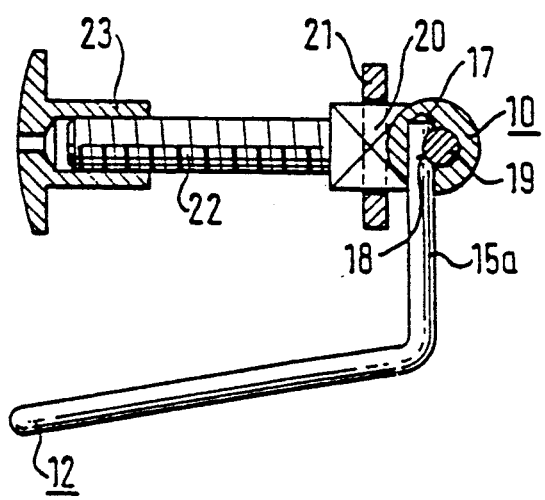
FIG. 4 is a section view along line B—B in FIG. 3.

In FIGS. 3 and 4, components, corresponding to those of FIGS. 1 and 2, are given the same reference numerals.

The essential difference between the embodiment of the quick release shown in FIGS. 3 and 4 compared with that shown in FIGS. 1 and 2 is that a lever arm 12 is provided, which has a different shape from that of the lever arm 11. The lever arm 12 is also substantially L-shaped. Whereas in the embodiment of FIGS. 1, 2a and 2b the lower portion of the lever arm 11 is bent to the right and is relatively short, the arrangement in FIGS. 3 and 4 is such that the lower area of the lever arm 12 is bent to the left and is relatively long. In addition, the two L-legs in the lever arm 12 have a somewhat smaller angle with respect to one another than in the embodiment of FIGS. 1 or 2a/2b in connection with the lever arm 11. In the embodiment according to FIGS. 3 and 4, between the two areas of the lever arm 12, there is an angle which is only slightly larger than a right angle.

It is obvious that both the size of the angle and the length of the areas in the case of the L-shaped lever arms 11, 12 can be modified at random and can be flexibly adapted to the particular shape requirements, without passing beyond the scope of the invention. For example, the two U-legs 15a, 15b could be multiply bent, unlike in the configuration shown in FIGS. 3 and 4.

FIGS. 5 and 6 illustrate another embodiment of the quick release according to the invention, which differs from the preceding embodiments, in which the lever arms 11 and 12 are bent, in that a lever arm 13 is provided. The lever arm 13 has U-legs 16a, 16b which have a rounded shape. More precisely the surface fixed by the two U-legs 16a, 16b forms a segment of a cylindrical surface. It is obvious that numerous modifications and, therefore, different roundings can be used for the U-legs 16a, 16b. In place of a cylindrical surface, it is also possible to adopt a surface, which, e.g., has a S-configuration.

Finally, it is also possible according to the invention, to combine bent or angled constructions according to FIGS. 1 to 4 and rounded constructions according to FIGS. 5 and 6 so as to bring about optimum adaptation of the shape of the lever arms 11, 12, 13 to constructional, design and shape requirements.

It is finally to be understood that although preferred embodiments of the present invention have been described, various other embodiments and variations may occur to those skilled in the art which fall within the scope and spirit of the invention, and such other embodiments and variations are intended to be covered by the following claims.

What we claim is:

1. A quick release for a bicycle comprising:
   an eccentric cam having a bearing bore;
   a shaft on which said eccentric cam is rotatably mounted;
   a hand lever engaged with said shaft; and a component fitted to said shaft which, with the aid of the eccentric cam, can be moved, by rotation of said hand lever in one direction, into a clamped position and, by rotation of said hand lever in an opposite direction, can be released from the clamped position;

wherein the hand lever is constructed as a lever arm made from a flexurally rigid material, said lever arm being substantially U-shaped, free ends of U-legs of the substantially U-shaped lever arm being, in each case, located in a lever arm fixing bore in the eccentric cam and having a channel which engages around the shaft to fix the lever arm in the eccentric cam.

2. A quick release according to claim 1, wherein two eccentric cams are provided, one of said eccentric cams being provided on each side of the component and fixable to a bicycle.

3. A quick release according to claim 1, wherein the U-legs of the lever arm are bent in a substantially L-shaped manner.

4. A quick release according to claim 1, wherein the U-legs of the lever arm are shaped like a cylindrical surface segment.

5. A quick release according to claim 1, wherein the substantially U-shaped arm is expanded in a C-shaped manner, in a vicinity of the U-cross-arm.

6. A quick release according to claim 1, wherein the substantially U-shaped lever arm is expanded in a vicinity of the U-cross-arm.

7. A quick release according to claim 1, wherein the lever arm is made from metal.

8. A quick release according to claim 1, wherein the lever arm is made from spring steel.

9. A lever arm according to claim 1, wherein a diameter of each of the U-legs of the lever arm is approximately 3 to 4 mm.

10. A quick release according to claim 1, wherein the lever arm is provided with a plastic covering.

* * * * *